Patented June 1, 1948

UNITED STATES PATENT OFFICE 2,442,452

METHOD OF ISOLATING LYSOZYME FROM ITS NATURALLY OCCURRING MIXTURES WITH OTHER BIOLOGIC COMPONENTS

Gordon Alderton, Albany, and Harry L. Fevold, Berkeley, Calif., assignors to the United States of America as represented by the Secretary of Agriculture No Drawing. Application December 18, 1945, Serial No. 635,813

11 Claims. (Cl. 195—62)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the enzyme lysozyme (or lysozymes) and has among its objects the provision of a method of isolating this enzyme in a substantially pure form and sufficiently free from contaminants to permit its use as a therapeutic agent in human and veterinary medicine.

The term "lysozyme" has been applied to a bacteriolytic agent found in the tissues of a number of species of animals, and available evidence indicates that it is a basic protein with a molecular weight near 18,000. The highest concentration of the agent which has been found in hen's egg white has the power to dissolve a thick suspension of test organism in a dilution of 1:500,000.

Previous chemical work on lysozyme has been concerned with its extraction from egg white. Acetone, ether, and alcohol precipitate the lysozyme from egg white aqueous solutions without destroying it, and it is this property which has formed the basis for the methods of preparation used in the prior art. In one method, the initial purification is obtained by rendering most of the egg-white proteins insoluble by selected acetone denaturation at the alkaline reaction of native egg white. In another method, the precipitated proteins are first extracted with a mixture of alcohol and aqueous acetic acid. This step is followed by concentration of the extract under vacuum, precipitation with alcohol, solution of the precipitate, and isoelectric precipitation of inactive protein with sulfuric acid. The lysozyme is then precipitated by flavianic acid. Repeated extraction of the dye-lysozyme complex with alcoholic ammonia liberates the active fraction from the dye. The insoluble residue containing lysozyme is freed from ammonia by washing with alcohol and ether followed by drying under vacuum. These methods, however, are laborious and expensive, and the yield and purity of the lysozyme obtained is apparently not substantial.

It is known that lysozyme is readily adsorbed in adsorbents such as charcoal, cellulose, porcelain, kaolin, silicic acid, filter paper, and many other substances, but elution of the lysozyme from the adsorbent irrespective of pH has not been obtained. Lysozyme has been adsorbed on kaolin suspended in buffer solutions, including phosphates, glycocolates, acetates, and dilute ammonia solutions at pH values ranging from 5.5 to 9. However, treatment of the kaolin-lysozyme complex with various buffer solutions having pHs ranging from 4.5 to 14 did not elute the active material. Attempts to separate the positively charged lysozyme from the negatively charged clay particles by cataphoresis also were unsuccessful.

We have found a method of isolating lysozyme from its naturally occurring mixtures with other biological components, such as egg white, which is simple and economical in operation and which results in a high yield of lysozyme in a substantially pure powdered or crystalline form.

According to the invention, lysozyme is first removed from a mixture in which it naturally occurs with other biologic components before it is finally isolated and recovered. This is accomplished by adsorbing it on an adsorbent such as a very finely divided clay, like bentonite, a hydrous silicate like synthetic zeolite, and an organic ion exchanger such as phenolic or sulfonic resin. Thereafter, contaminating substances, such as adsorbed inactive proteins adhering to the adsorbent, may be removed by using selected eluents such as alkaline pyridines and/or inorganic buffers at different selective pH's. For example, appreciable amounts of inactive protein are eluted by pyridine or pyridine-sulfuric acid solutions at pH values exceeding 6.2. Reducing the pH value below 6.2 will cause the elution of the lysozyme from the adsorbent. After contaminants have been removed, the lysozyme is then eluted from the surface of the adsorbent by using organic bases, and, by controlling the pH of the eluent, the elution may be made specific for the enzyme. In this respect, it has been found that upon lowering the pH, removal of the lysozyme from the adsorbent begins at about pH 6.2, rises sharply to a maximum at about pH 5.0, and falls off to zero at about pH 3.0. It is apparent, therefore, that elution of the lysozyme is most effectively obtained when operating within a pH range of about from 3.0 to 6.2, while removal of contaminants without removing the lysozyme is accomplished at pH values exceeding 6.2. For best results, elution should follow adsorption within 24 hours.

The following example, which is illustrative of the invention, illustrates the isolation and recovery of lysozyme from egg white:

To one liter of egg white was added 150 ml. of a 10 percent suspension of bentonite (clay) in 1 percent KCl, and the mixture was stirred vigorously (avoiding foaming) for about 3 to 5 minutes. The clay was then separated from the suspension in a Sharples centrifuge and washed with 0.5 M phosphate buffer at pH 7.5 to remove the contaminating egg white mechanically held in the clay mass. The clay was then washed three times with 300 ml. (total 900 ml.) of a 5 percent aqueous solution of pyridine to remove the adsorbed contaminants such as adsorbed inactive proteins. Elution of the lysozyme was then accomplished by washing the clay twice with 300 ml. of a 5 percent aqueous solution of pyridine which had been adjusted to pH 5 by the addition of sulfuric acid. The solution of lysozyme was then removed from the clay by centrifuging. The lysozyme was then removed from solution by precipitation with a salt such as ammonium sulfate, the precipitate centrifuged off, redissolved in distilled water, freed from salt by dialysis, and the water removed by evaporation from the frozen state in vacuum. The lysozyme was obtained as a light, fluffy, stable powder.

The above example illustrates a procedure effecting the separation of lysozyme from the other components of egg white. A yield as high as 90 percent of the lysozyme present in the egg white was obtained, the anti-bacterial activity of the product being about 35 to 40 times that of the original egg white. The product was further found to be readily crystallizable. It was not found possible to detect the presence of any material other than lysozyme in the product by the application of physical, chemical, and biological tests, and it is concluded that the powder is pure lysozyme.

Having thus described our invention, we claim:

1. A method of isolating lysozyme from its naturally occurring mixture with other biologic components, comprising adding to said mixture an adsorbent selected from the group consisting of a finely divided clay, a synthetic zeolite, and an organic ion exchanger to adsorb the lysozyme, removing mechanically occluded material from the lysozyme-containing adsorbent by washing with an inorganic buffer solution, removing adsorbed contaminants from the lysozyme-containing adsorbent by elution with an organic base at a pH above 6.2, and removing the lysozyme from the adsorbent by elution with an organic base adjusted to a pH of about from 3.0 to 6.2.

2. The method of claim 1 wherein both organic bases are pyridine.

3. The method of claim 1 wherein both organic bases are aqueous solutions of pyridine.

4. A method of isolating lysozyme from egg white comprising adding to egg white an adsorbent selected from the group consisting of a finely divided clay, a synthetic zeolite, and an organic ion exchanger to adsorb the lysozyme, removing mechanically occluded material from the lysozyme-containing adsorbent by washing with an inorganic buffer solution, removing adsorbed contaminants from the lysozyme-containing adsorbent by elution with an organic base at a pH above 6.2, and removing the lysozyme from the adsorbent by elution with an organic base adjusted to a pH of about from 3.0 to 6.2.

5. A method of isolating lysozyme from egg white comprising adding to egg white an adsorbent selected from the group consisting of a finely divided clay, a synthetic zeolite, and an organic ion exchanger to adsorb the lysozyme, removing mechanically occluded material from the lysozyme-containing adsorbent by washing with an inorganic buffer solution, removing adsorbed contaminants from the lysozyme-containing adsorbent by elution with aqueous pyridine at a pH above 6.2, and removing the lysozyme from the adsorbent by elution with aqueous pyridine adjusted to a pH of about 5.0.

6. A method of isolating lysozyme from egg white comprising adding to egg white an adsorbent selected from the group consisting of a finely divided clay, a synthetic zeolite, and an organic ion exchanger to adsorb the lysozyme, removing mechanically occluded material from the lysozyme-containing adsorbent by washing with phosphate buffer at a pH of about 7.5, removing adsorbed contaminants from the lysozyme-containing adsorbent by elution with a 5 percent aqueous solution of pyridine at a pH above 6.2, and removing the lysozyme from the adsorbent by elution with a 5 percent aqueous solution of pyridine which has been adjusted to a pH of about 5.0.

7. A method of separating lysozyme from an adsorbent selected from the group consisting of a finely divided clay, a synthetic zeolite, and an organic ion exchanger upon which it is adsorbed, comprising eluting the lysozyme-containing adsorbent with an organic base adjusted to a pH of about from 3.0 to 6.2.

8. A method of separating lysozyme from an adsorbent selected from the group consisting of a finely divided clay, a synthetic zeolite, and an organic ion exchanger upon which it is adsorbed, comprising eluting the lysozyme-containing adsorbent with pyridine adjusted to a pH of about from 3.0 to 6.2.

9. A method of separating lysozyme from an adsorbent selected from the group consisting of a finely divided clay, a synthetic zeolite, and an organic ion exchanger upon which it is adsorbed, comprising eluting the lysozyme-containing adsorbent with aqueous pyridine which has been adjusted to a pH of about 5.0.

10. A method of separating lysozyme from an adsorbent selected from the group consisting of a finely divided clay, a synthetic zeolite, and an organic ion exchanger upon which it is adsorbed, comprising eluting the lysozyme-containing adsorbent with a 5 percent aqueous solution of pyridine which has been adjusted to a pH of about 5.0.

11. A method of separating lysozyme from bentonite upon which it is adsorbed, comprising eluting the lysozyme-containing bentonite with a 5 percent aqueous solution of pyridine which has been adjusted to a pH of about 5.0.

GORDON ALDERTON.
HARRY L. FEVOLD.

REFERENCES CITED

The following references are of record in the file of this patent:

Taketomi, Journal of the Soc. of Chemical Industry, Japan, volume 39, number 6, page 206B.
Hassler, Industrial and Engineering Chemistry, volume 32, number 5, May 1940, pages 643, 644.